(12) United States Patent
Sonobe et al.

(10) Patent No.: US 10,608,787 B2
(45) Date of Patent: Mar. 31, 2020

(54) WIRELESS COMMUNICATION SYSTEM, RETRANSMISSION PARAMETER DETERMINATION DEVICE AND RETRANSMISSION PARAMETER REPORT METHOD

(71) Applicant: Mobile Techno Corp., Yokohama-shi, Kanagawa (JP)

(72) Inventors: Satoshi Sonobe, Nagareyama (JP); Masanori Yofune, Ota (JP); Atsuhiko Sugitani, Yokosuka (JP)

(73) Assignee: Mobile Techno Corp., Yokohama-shi (JP)

( * ) Notice: Subject to any disclaimer, the term of this patent is extended or adjusted under 35 U.S.C. 154(b) by 121 days.

(21) Appl. No.: 15/891,849

(22) Filed: Feb. 8, 2018

(65) Prior Publication Data

US 2019/0068326 A1 Feb. 28, 2019

(30) Foreign Application Priority Data

Aug. 24, 2017 (JP) .................................. 2017-161357

(51) Int. Cl.
*H04L 1/00* (2006.01)
*H04W 74/08* (2009.01)
(Continued)

(52) U.S. Cl.
CPC ............ *H04L 1/0061* (2013.01); *H04L 1/005* (2013.01); *H04L 1/0018* (2013.01);
(Continued)

(58) Field of Classification Search
CPC ..... H04L 1/0061; H04L 1/0018; H04L 1/005; H04L 1/0072; H04L 1/1671;
(Continued)

(56) References Cited

U.S. PATENT DOCUMENTS

2005/0124372 A1* 6/2005 Lundby ............... H04W 52/146
455/522
2009/0219851 A1 9/2009 Abraham et al.
(Continued)

FOREIGN PATENT DOCUMENTS

| JP | 5254369 B2 | 8/2013 |
| WO | WO-2009120460 A2 | 10/2009 |
| WO | WO-2016120215 A1 | 8/2016 |

OTHER PUBLICATIONS

"European Serial No. 18155727.3 EP Search Report dated Dec. 3, 2018", 11 pgs.
(Continued)

*Primary Examiner* — April Y Blair
*Assistant Examiner* — Sazzad Hossain
(74) *Attorney, Agent, or Firm* — Schwegman Lundberg & Woessner, P.A.

(57) ABSTRACT

A wireless communication system, in which a redundancy bit is transmitted from a first communication device to a second communication device when the second communication device fails to decode the encoded bits, includes a processor. The processor selects communication patterns that respectively satisfy a requested quality, calculates, for each of the selected communication patterns, a transmission data length that indicates a length of the redundancy bit, calculates, for each of the selected communication patterns, a transmission latency between the first communication device and the second communication device based on the calculated transmission data length, and generates a retransmission parameter corresponding to a communication pattern with lowest transmission latency among the selected communication patterns. The first communication device transmits the redundancy bit according to the retransmission parameter, and the second communication device decodes (Continued)

the encoded bits by using the redundancy bit according to the retransmission parameter.

6 Claims, 12 Drawing Sheets

(51) Int. Cl.
*H04L 1/16* (2006.01)
*H04L 1/18* (2006.01)
*H01Q 5/00* (2015.01)

(52) U.S. Cl.
CPC .......... *H04L 1/0072* (2013.01); *H04L 1/1671* (2013.01); *H04L 1/1819* (2013.01); *H04L 1/1825* (2013.01); *H04L 1/1829* (2013.01); *H04W 74/0816* (2013.01); *H01Q 5/00* (2013.01); *H04L 1/0003* (2013.01); *H04L 1/0009* (2013.01); *H04L 1/0019* (2013.01); *H04L 1/0025* (2013.01); *H04L 1/0075* (2013.01); *H04L 1/0083* (2013.01)

(58) Field of Classification Search
CPC ... H04L 1/1819; H04L 1/1825; H04L 1/1829; H04L 1/0003; H04L 1/0009; H04L 1/0019; H04L 1/0025; H04L 1/0075; H04L 1/0083; H04W 74/0816; H01Q 5/00
See application file for complete search history.

(56) References Cited

U.S. PATENT DOCUMENTS

| 2011/0087944 A1* | 4/2011 | Li ........................ H04L 1/0015 714/748 |
| 2013/0294357 A1 | 11/2013 | Shimanuki et al. |
| 2014/0376519 A1* | 12/2014 | Yang ................ H04W 74/0816 370/336 |
| 2016/0242070 A1 | 8/2016 | Asterjadhi et al. |
| 2016/0277156 A1* | 9/2016 | Bayesteh .............. H04L 1/1819 |
| 2018/0013516 A1* | 1/2018 | Zoellner ............... H04L 1/0045 |

OTHER PUBLICATIONS

"European Application Serial No. 18155727.3, Partial European Search Report dated Aug. 17, 2018", 10 pgs.

Cheng, J.F., et al., "Adaptive incremental redundancy", IEEE 58th Veh. Technol. Conf., vol. 2, (Oct. 2003), 737-741.

Szczecinski, Leszek, et al., "Adaptive incremental redundancy for HARQ transmission with outdated CSI", Global Telecommunications Conference, (2011).

* cited by examiner

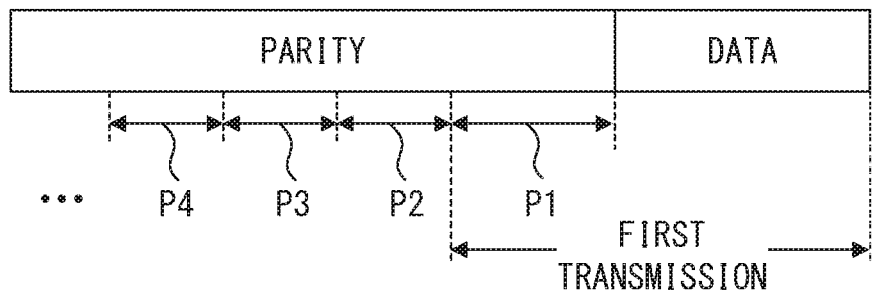
F I G. 1A
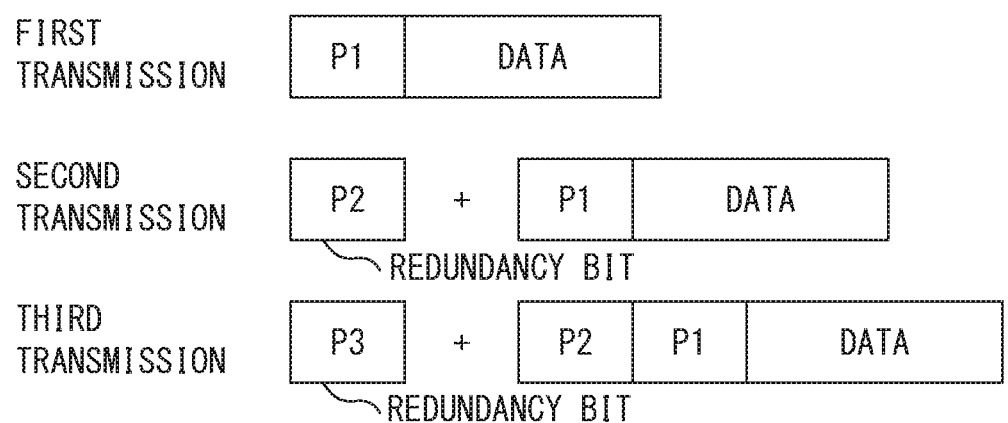
F I G. 1B

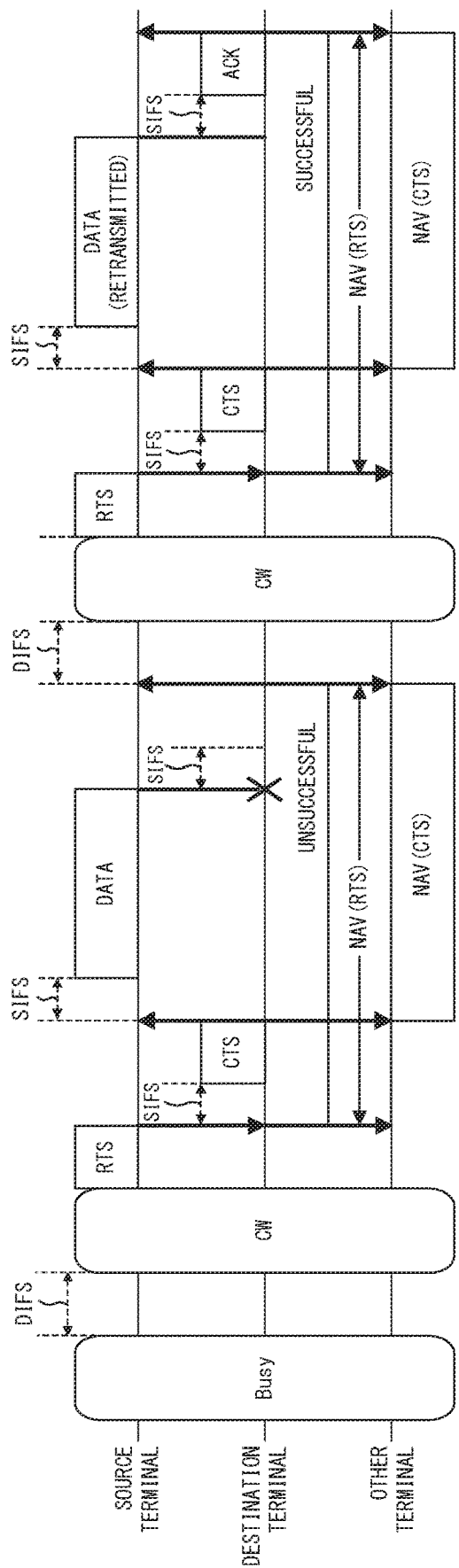
F I G. 10

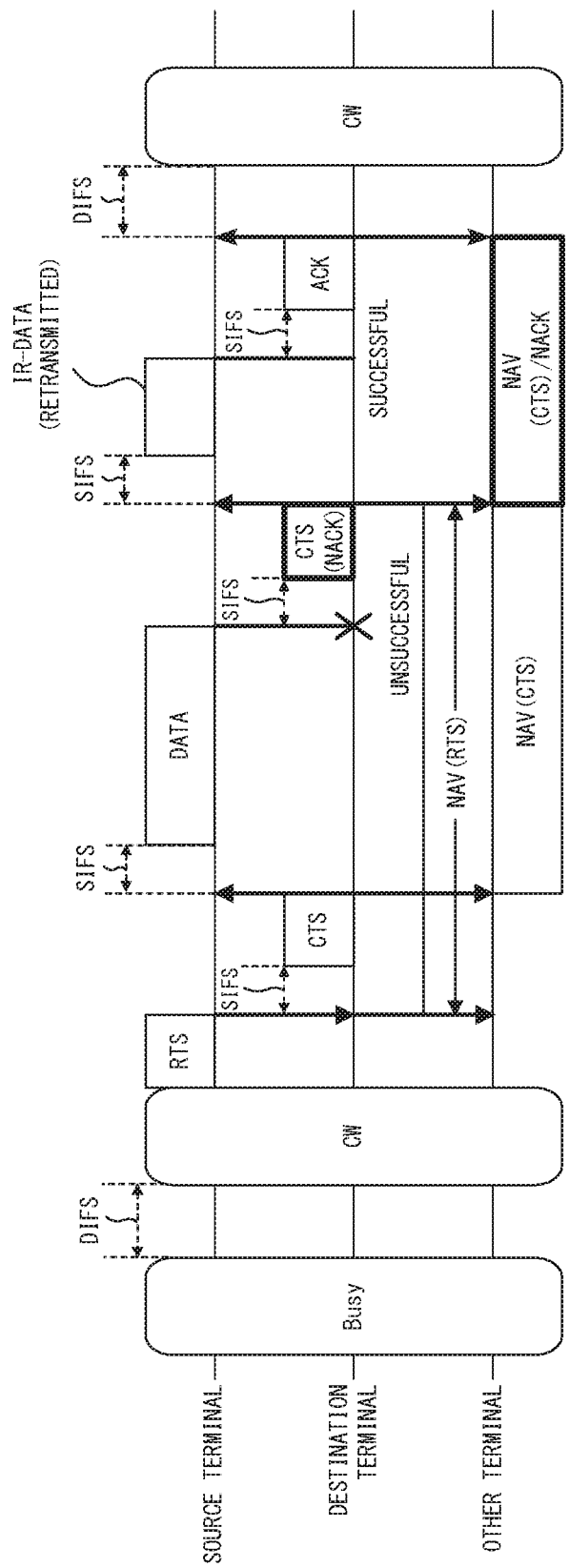
F I G. 12

WIRELESS COMMUNICATION SYSTEM, RETRANSMISSION PARAMETER DETERMINATION DEVICE AND RETRANSMISSION PARAMETER REPORT METHOD

CLAIM FOR PRIORITY

This application is based upon and claims the benefit of priority of the prior Japanese Patent Application No. 2017-161357, filed on Aug. 24, 2017, the entire contents of which are incorporated herein by reference.

FIELD

The embodiments discussed herein are related to a device for determining a retransmission parameter and a method for reporting the retransmission parameter in a wireless communication system.

BACKGROUND

A wireless local area network (wireless LAN) has become widespread as a wireless communication system. Carrier sense multiple access collision avoidance (CSMA/CA) is often used in a wireless LAN.

In a system that uses CSMA/CA, a transmission terminal checks whether a wireless resource is being used by other terminals before the transmission terminal starts transmitting data. When the wireless resource is not being used by other terminals, the transmission terminal transmits a data signal. This procedure permits an avoidance of a packet collision. However, a packet collision may occur when a plurality of terminals start transmitting data at the same time or when there exists a hidden terminal. When a packet collision has occurred, a reception terminal is not successful in receiving data.

When the data reception is not successful, a retransmission control is performed between the transmission terminal and the reception terminal. In general, the retransmission control is performed by, for example, a hybrid automatic repeat request (HARQ). The HARQ can perform a retransmission control with incremental redundancy.

In a wireless communication system that uses a retransmission control with incremental redundancy, a portion of encoded bits are transmitted in a first transmission, as illustrated in FIG. 1A. The encoded bits include data and a parity bit. The parity bit is redundancy information used to decode the data. Data and a portion of the parity bit are transmitted in the first transmission. In the example illustrated in FIG. 1A, data and a parity bit P1 are transmitted in the first transmission.

The reception terminal tries to decode data using received bits. Here, as illustrated in FIG. 1B, the reception terminal tries to decode the data using the parity bit P1. When the data is decoded properly, retransmission is not performed. On the other hand, when the data is not properly decoded, retransmission is performed.

A parity bit that has not been transmitted yet is transmitted in a retransmission scheme (that is, in the second and subsequent transmissions). The parity bit transmitted in the second and subsequent transmission may hereinafter be referred to as a "redundancy bit". For example, when the first transmission is not successful, a parity bit P2 illustrated in FIG. 1A is transmitted as a redundancy bit. Then, the reception terminal tries to decode the data using previously received bits and a newly received redundancy bit. Here, the reception terminal tries to decode the data using the parity bits P1 and P2, as illustrated in FIG. 1B. Likewise, a retransmission control is performed repeatedly until data is decoded properly. Here, parity bits P3, P4, . . . are sequentially transmitted as a redundancy bit.

A technology that applies HARQ to a wireless LAN protocol is disclosed in, for example, Japanese Patent No. 5254369. Further, a retransmission control with incremental redundancy is disclosed in, for example, J. F. Cheng et al., "Adaptive Incremental Redundancy," IEEE 58th Veh. Technol. Conf. (VTC 2003-Fall), vol. 2, pp. 737-741, October 2003.

As described above, a wireless communication system that uses a retransmission control with incremental redundancy has been proposed. However, with respect to a conventional retransmission control with incremental redundancy, the number of iterations of an iterative decoding that affects a transmission latency is not taken into consideration, so there is room for improvement in the efficiency in retransmission. Further, for example, with respect to a retransmission control used in a conventional wireless LAN, there is a need for a source terminal to obtain a right to transmission again when a destination terminal is not successful in receiving data. However, the source terminal is not always able to immediately obtain a right to transmission during a next time period (contention window: CW) in which a right to transmission is to be obtained, so there is a possibility that a transmission efficiency (throughput) will be decreased because it may take a long time to perform a retransmission control.

SUMMARY

According to an aspect of the embodiments, a wireless communication system includes a processor. Encoded bits are transmitted from a first wireless communication device to a second wireless communication device and a redundancy bit for decoding the encoded bits is transmitted from the first wireless communication device to the second wireless communication device when the second wireless communication device fails to decode the encoded bits in the wireless communication system. The processor selects one or more communication patterns that respectively satisfy a requested quality, each of the communication patterns indicating a combination of a plurality of parameters including a coding rate and a number of iterations of an iterative decoding. The processor calculates, for each of the selected communication patterns, a transmission data length that indicates a length of the redundancy bit wherein the second wireless communication device is expected to successfully decode the encoded bits by using the redundancy bit. The processor calculates, for each of the selected communication patterns, a transmission latency between the first wireless communication device and the second wireless communication device based on the calculated transmission data length. The processor generates a retransmission parameter corresponding to a communication pattern with lowest transmission latency among the selected communication patterns. The first wireless communication device transmits the redundancy bit according to the retransmission parameter. The second wireless communication device decodes the encoded bits by using the redundancy bit according to the retransmission parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams that explain an outline of a retransmission control with incremental redundancy;

FIG. 10 illustrates an example of a retransmission control performed in a wireless LAN system that employs CSMA/CA;

FIG. 12 illustrates an example of a retransmission control according to a fifth embodiment.

DESCRIPTION OF EMBODIMENTS

Figure 2:
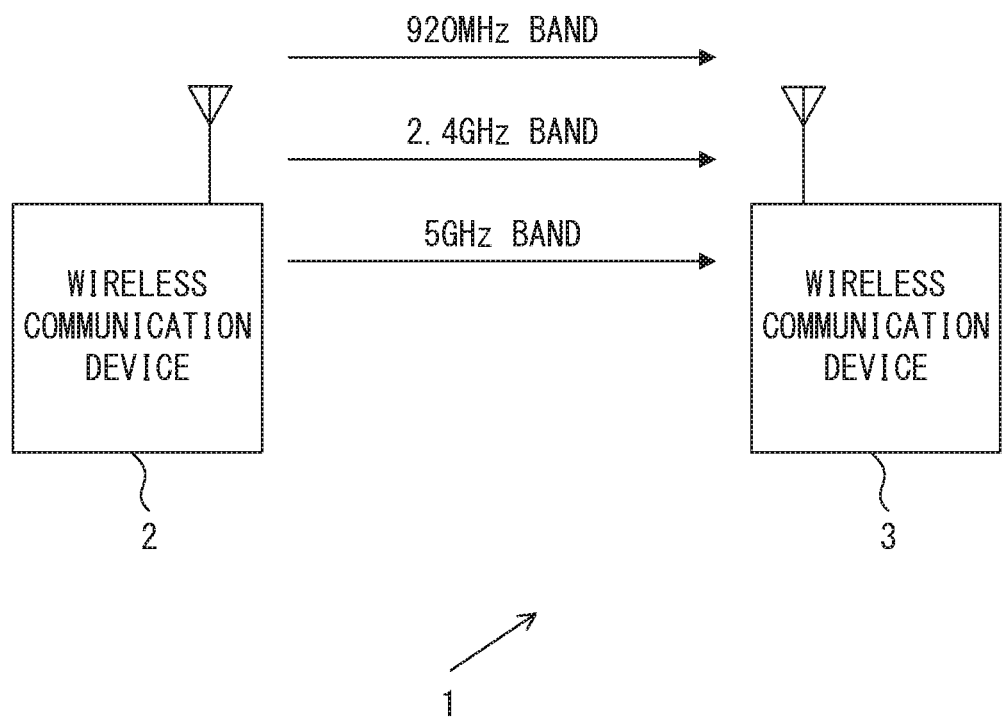
FIG. 2 illustrates an example of a wireless communication system according to embodiments of the present invention.

FIG. 2 illustrates an example of a wireless communication system according to embodiments of the present invention. A wireless communication system 1 illustrated in FIG. 2 is, for example, a wireless LAN system, although it is not particularly limited to this configuration. The wireless communication system 1 includes wireless communication devices 2 and 3. Each of the wireless communication devices 2 and 3 is, for example, a user equipment. The user equipment may be a mobile device. CSMA/CA is used in the wireless communication system 1 in order to avoid a packet collision. Note that a retransmission control with incremental redundancy is performed in this wireless LAN.

The wireless communication device 2, 3 can transmit data using a plurality of frequency bands. Specifically, the wireless communication device 2, 3 can transmit data using a plurality of frequency bands at the same time. In the embodiments, the wireless communication device 2, 3 can transmit data using two or more frequency bands from among a 920 MHz band, a 2.4 GHz band, and a 5 GHz band at the same time. The communication quality between the wireless communication devices 2 and 3 differs depending on the frequency band. Thus, the wireless communication device 2, 3 may transmit data using a different modulation scheme and a different code depending on the frequency band.

First Embodiment

In a first embodiment, data is transmitted using one frequency band. In other words, in the example illustrated in FIG. 2, data is transmitted between the wireless communication devices 2 and 3 using one of the 920 MHz band, the 2.4 GHz band, and the 5 GHz band.

Figure 3:
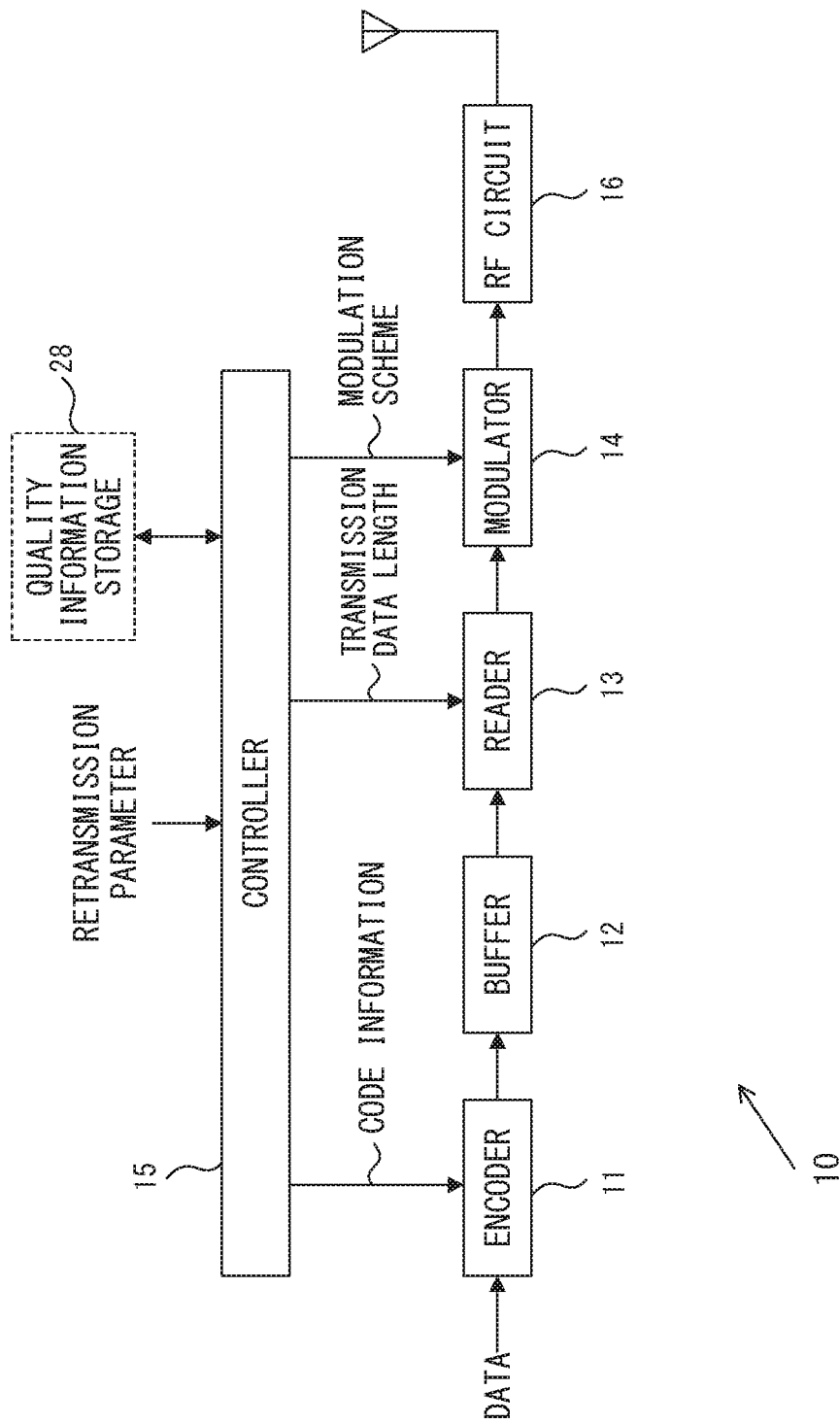
FIG. 3 illustrates an example of a transmitter implemented in the wireless communication device.

FIG. 3 illustrates an example of a transmitter implemented in the wireless communication device. As illustrated in FIG. 3, a transmitter 10 includes an encoder 11, a buffer 12, a reader 13, a modulator 14, a controller 15, and an RF circuit 16. The transmitter 10 may include other circuit elements that are not illustrated in FIG. 3. For example, the transmitter 10 may include a quality information storage 28 that will be described later.

The encoder 11 encodes input data so as to generate encoded bits according to an instruction given by the controller 15. Here, the controller 15 gives the encoder 11 an instruction that includes code information indicating a code type and/or a coding rate. Thus, the encoder 11 encodes input data so as to generate encoded bits using a code type and/or a coding rate that are specified by the controller 15.

As illustrated in FIG. 1A, encoded bits include data and a parity bit. The encoded bits generated by the encoder 11 are stored in the buffer 12.

The reader 13 reads a portion of the encoded bits stored in the buffer 12 according to an instruction given by the controller 15. In the first transmission, the reader 13 reads the data and a portion of the parity bit (that is, the parity bit P1) from the buffer 12, as illustrated in FIG. 1A. In data retransmission, the reader 13 reads a portion of the parity bit (that is, a redundancy bit) from the buffer 12. The length of a redundancy bit is specified by a retransmission parameter (in this case, a transmission data length).

The modulator 14 modulates the bits read by the reader 13 so as to generate a modulated signal according to an instruction given by the controller 15. Here, the controller 15 specifies a modulation scheme. For example, the modulation scheme is specified by a user in advance. Alternatively, the modulation scheme may be dynamically determined according to the wireless environment.

The controller 15 controls an operation of the transmitter 10. In other words, the controller 15 can control operations of the encoder 11, the reader 13, and the modulator 14. Here, the controller 15 gives the encoder 11 an instruction indicating code information (a code type and/or a coding rate). Further, the controller 15 gives the modulator 14 an instruction indicating a modulation scheme. Further, in data retransmission, the controller 15 gives the reader 13 an instruction indicating a transmission data length. The controller 15 is implemented by, for example, a processor system that includes a processor element and a memory. In this case, the processor element provides the function of the controller 15 by executing a program stored in the memory. Alternatively, the controller 15 may be implemented by a digital signal processing circuit.

The RF circuit 16 upconverts a modulated signal output from the modulator 14 to a radio frequency band (RF band), so as to generate an RF modulated signal. This RF modulated signal is output via an antenna.

Figure 4:
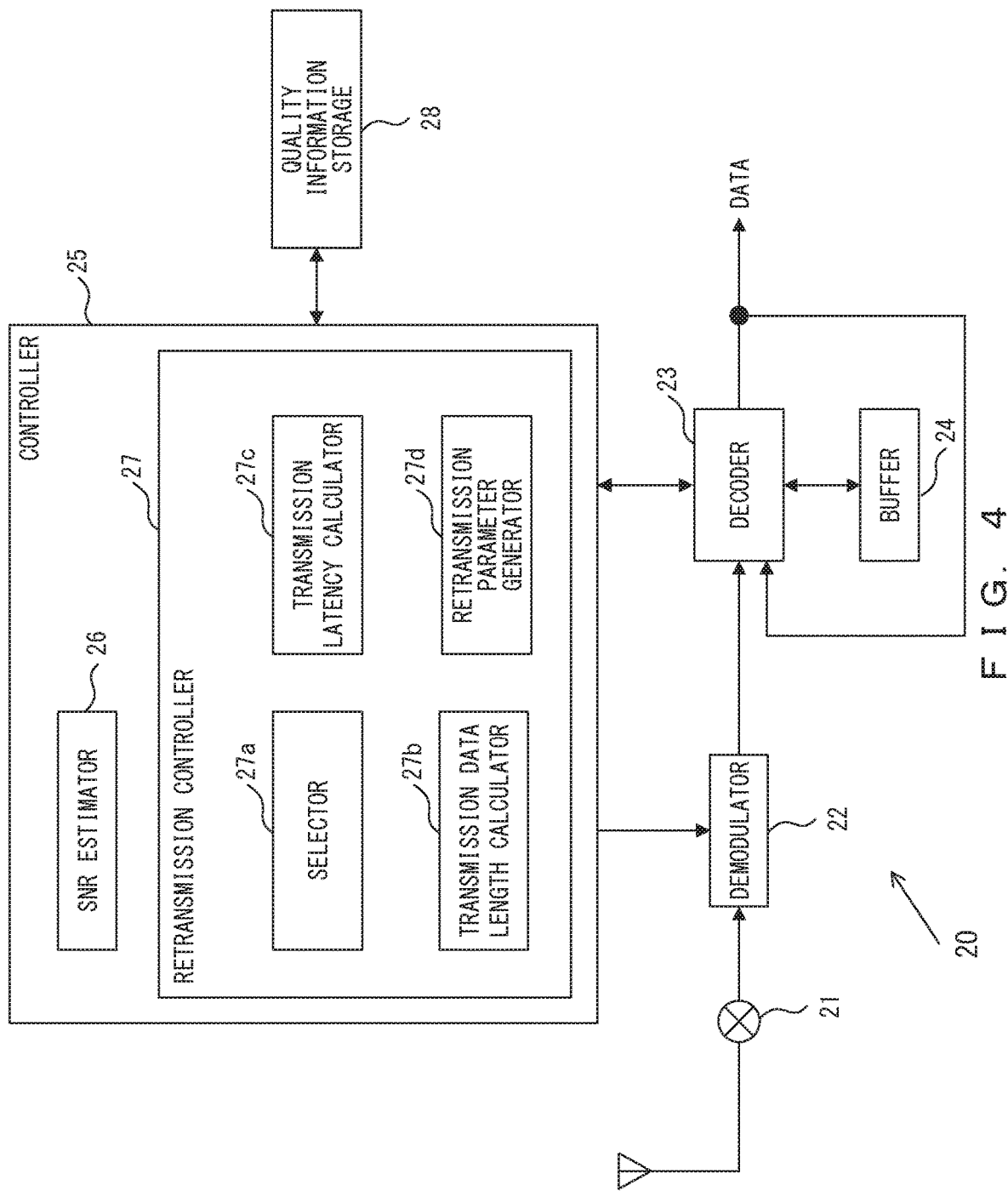
FIG. 4 illustrates an example of a receiver implemented in the wireless communication device.

FIG. 4 illustrates an example of a receiver implemented in the wireless communication device. As illustrated in FIG. 4, a receiver 20 includes a down-conversion circuit 21, a demodulator 22, a decoder 23, a buffer 24, a controller 25, and a quality information storage 28. The receiver 20 may include other circuit elements that are not illustrated in FIG. 4.

An RF modulated signal output from the transmitter 10 illustrated in FIG. 3 arrives at the receiver 20. The down-conversion circuit 21 downconverts the RF modulated signal received via an antenna to a baseband.

The demodulator 22 demodulates an output signal of the down-conversion circuit 21 according to an instruction given by the controller 25. The demodulation process performed by the demodulator 22 corresponds to the modulation process performed by the modulator 14 in FIG. 3.

The decoder 23 decodes a demodulated signal output from the demodulator 22 according to an instruction given by the controller 25. In other words, the decoder 23 recovers the transmitted bits. Here, the controller 25 specifies the number of iterations of an iterative decoding. Then, the decoder 23 performs decoding process repeatedly the number of times specified by the controller 25. When the decoder 23 is not successful in decoding received data, the decoder 23 reports the failure to the controller 25.

The buffer 24 stores a demodulated signal output from the demodulator 22. In a data retransmission process, the decoder 23 performs decoding process on the demodulated signal stored in the buffer 24 and a demodulated signal newly output from the demodulator 22 (that is, a likelihood value corresponding to redundancy bits). For example, it is assumed that the data and the parity bit P1 illustrated in FIG. 1A or 1B are transmitted in the first data transmission. In this case, the decoder 23 performs decoding process on likelihood values corresponding to the data and the parity bit P1. Here, the likelihood values corresponding to the data and the parity bit P1 of FIG. 1A or 1B are stored in the buffer 24. When the data is not properly decoded, the parity bit P2 illustrated in FIG. 1A or 1B is transmitted as a redundancy bit. In this case, the decoder 23 performs decoding process on likelihood values corresponding to the data, the parity bit P1, and the parity bit P2. Likewise, a parity bit is added every time data retransmission is performed, which increases the chance that data will be properly decoded.

The controller 25 controls an operation of the receiver 20. In other words, the controller 25 can control operations of the demodulator 22 and the decoder 23. The controller 25 includes an SNR estimator 26 and a retransmission controller 27. The controller 25 is implemented by, for example, a processor system that includes a processor element and a memory. In this case, the processor element provides the function of the controller 25 by executing a program stored in the memory. Alternatively, the controller 25 may be implemented by a digital signal processing circuit.

The SNR estimator 26 estimates a signal-to-noise ratio (SNR) of a signal received from the transmitter 10 illustrated in FIG. 3. The SNR is estimated by measuring a power in a specified region in a preamble of the received signal. The retransmission controller 27 includes a selector 27a, a transmission data length calculator 27b, a transmission latency calculator 27c, and a retransmission parameter generator 27d. The retransmission controller 27 generates a retransmission parameter when the decoder 23 is not successful in decoding received data.

The selector 27a selects a communication pattern that satisfies a requested quality according to the SNR estimated by the SNR estimator 26. Here, it is preferable that the selector 27a select all of the communication patterns that satisfy the requested quality. The communication pattern indicates a combination of a plurality of parameters including a coding rate and the number of iterations of an iterative decoding. For example, the communication pattern may indicate a combination of a modulation scheme, a coding rate, and the number of iterations of an iterative decoding. Further, the selector 27a may refer to quality information stored in the quality information storage 28 so as to select one or more communication patterns. The quality information indicates, for example, an error rate (for example, a block error rate: BLER) with respect to an SNR. The quality information is generated by measurement or simulation in advance and stored in the quality information storage 28.

The transmission data length calculator 27b calculates a transmission data length that indicates a length of a redundancy bit that is to be transmitted by the transmitter 10 in next transmission process for each of the communication patterns selected by the selector 27a. The transmission data length indicates a length of a next redundancy bit by which encoded bits are expected to be successfully decoded when the decoding process is performed on the encoded bits by using the next redundancy bit.

The transmission latency calculator 27c calculates a transmission latency between the transmitter 10 and the receiver 20 based on the transmission data length calculated by the transmission data length calculator 27b for each of the communication patterns selected by the selector 27a. In the present embodiment, the transmission latency includes a time needed to propagate a signal from the transmitter 10 to the receiver 20, a time of processing performed by the demodulator 22, and a time of processing performed by the decoder 23.

The retransmission parameter generator 27d identifies, from among the communication patterns selected by the selector 27a, a communication pattern with lowest transmission latency. Then, the retransmission parameter generator 27d generates a retransmission parameter based on the identified communication pattern. The retransmission parameters include a transmission data length and the number of iterations of an iterative decoding. The retransmission parameters may include other parameters (such as a modulation scheme) in addition to the transmission data length and the number of iterations of an iterative decoding. The retransmission parameter is reported from the receiver 20 to the transmitter 10.

Figure 5:
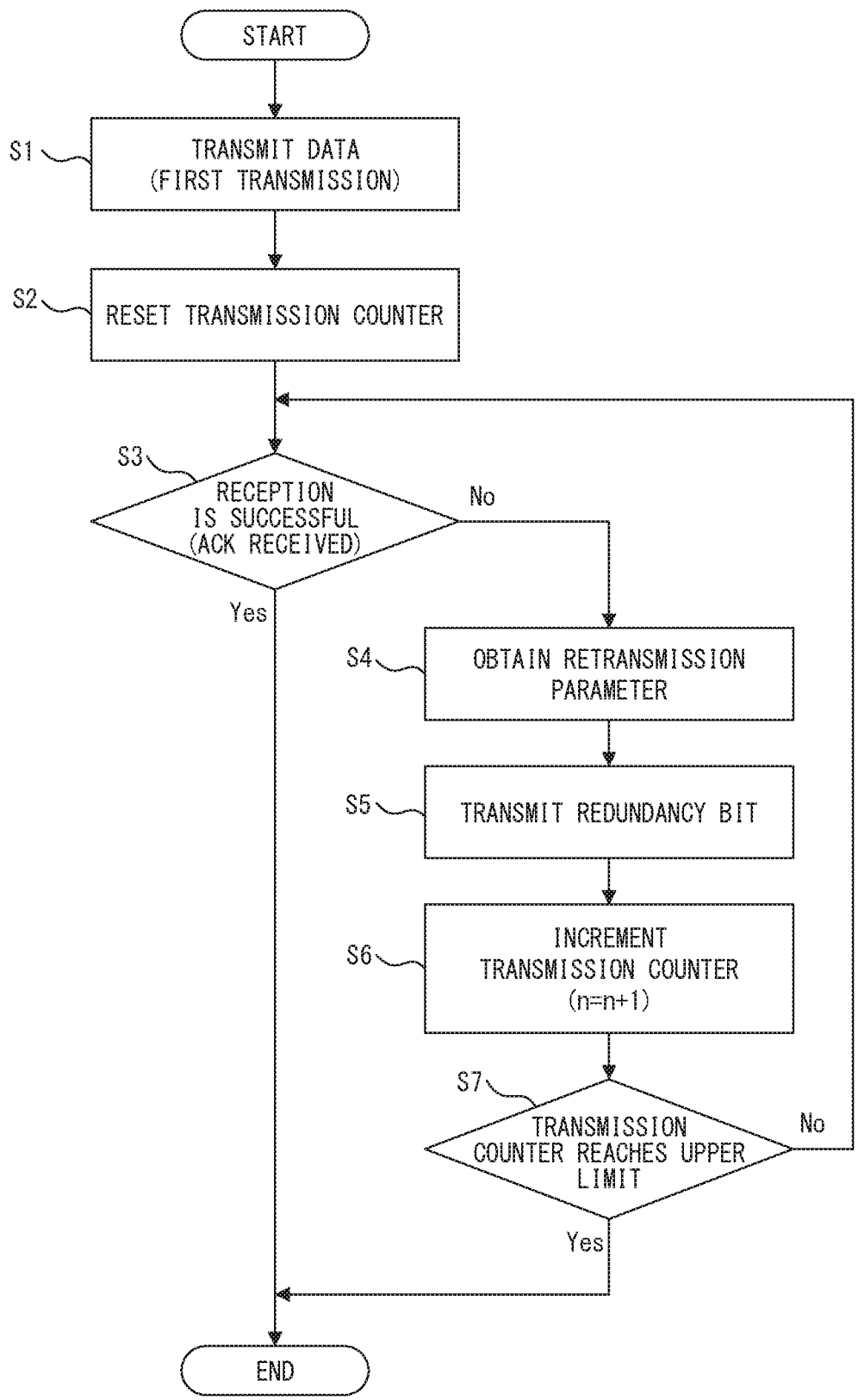
FIG. 5 is a flowchart that illustrates an example of an operation of the transmitter.

FIG. 5 is a flowchart that illustrates an example of an operation of the transmitter 10. The process of this flowchart is performed with respect to each transmission frame. The transmission frame includes data and a parity bit as illustrated in FIG. 1B, and is generated by the encoder 11. It is assumed that a code type and a coding rate are specified by the controller 15.

In S1, the transmitter 10 performs the first transmission. In the first transmission, the transmitter 10 encodes data and a portion of a parity bit (the parity bit P1 in the example illustrated in FIG. 1B) and transmits the encoded bits to the receiver 20. It is assumed that the transmission data length in the first transmission is determined in advance. In S2, the controller 15 resets a transmission counter. The transmission counter indicates the number of data retransmissions performed on one transmission frame.

In S3, the controller 15 decides whether the receiver 20 is successful in receiving data. In the present embodiment, the receiver 20 returns an ACK (acknowledgement) signal indicating that data reception is successful to the transmitter 10 when the receiver 20 is successful in decoding data. Thus, the controller 15 decides that the receiver 20 is successful in receiving data when the controller 15 receives the ACK signal from the receiver 20 within a specified time period from the data transmission of the transmitter 10. In this case, the controller 15 terminates the data transmission process performed by the transmitter 10. On the other hand, the controller 15 decides that the receiver 20 is not successful in receiving data when the transmitter 10 does not receive the ACK signal from the receiver 20 within the specified time period from the data transmission of the transmitter 10. In this case, the transmitter 10 performs the processes of S4 to S7.

In S4, the controller 15 obtains a retransmission parameter. The retransmission parameter is generated by the receiver 20 and reported to the transmitter 10. Here, the retransmission parameters reported from the receiver 20 to the transmitter 10 include at least a value that indicates a transmission data length. A method for generating a retransmission parameter will be described later with reference to FIGS. 6 and 7.

In S55, the transmitter 10 performs a data retransmission according to the retransmission parameter. Here, the reader 13 reads a parity bit (that is, a redundancy bit) from the buffer 12 according to the transmission parameter. The length of a parity bit read from the buffer 12 corresponds to a transmission data length specified as a retransmission parameter. The modulator 14 modulates the redundancy bit output from the reader 13 so as to generate a modulated signal. This modulated signal is output via an antenna after it is upconverted to a radio frequency band (RF band).

In S6, the controller 15 increments a transmission counter by one. A variable n illustrated in FIG. 5 represents a count value of the transmission counter. In S7, the controller 15 decides whether the transmission counter has reached a specified upper limit. When the transmission counter has not reached the upper limit, the process performed in the transmitter 10 returns to S3. On the other hand, when the transmission counter has reached the upper limit, the controller 15 terminates the process performed in the transmitter 10.

As described above, the transmitter 10 performs data retransmission repeatedly until the receiver 20 is successful in receiving data or until the transmission counter reaches a specified upper limit in S7. Note that, when the retransmission control with incremental redundancy is performed, a different parity bit (P2, P3, P4, . . . ) is transmitted every time data retransmission is performed, as illustrated in FIG. 1B. Here, the length of a parity bit transmitted in each data retransmission is specified by a retransmission parameter.

Figure 6:
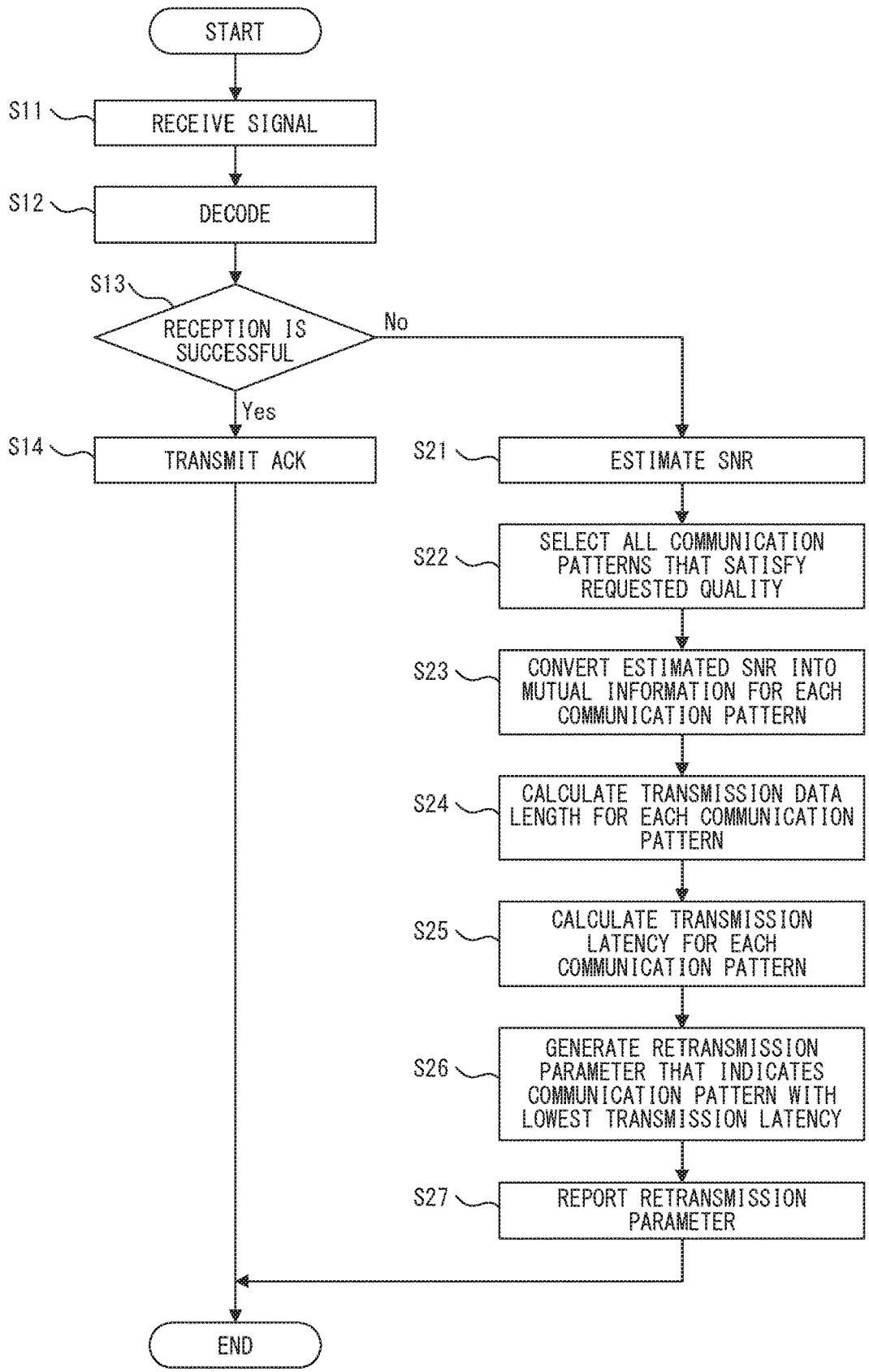
FIG. 6 is a flowchart that illustrates an example of an operation of the receiver.

FIG. 6 is a flowchart that illustrates an example of an operation of the receiver 20. The process of this flowchart is performed with respect to each data transmission. For example, the process of this flowchart is performed with respect to each data retransmission when data retransmission is performed repeatedly.

In S11 and S12, the receiver 20 receives a radio signal transmitted from the transmitter 10. The demodulator 22 demodulates the received signal and outputs the demodulated signal. The decoder 23 decodes the demodulated signal output from the demodulator 22. In this case, the number of iterations of an iterative decoding in the first data reception is determined in advance and is specified by the controller 25. In the process of data retransmission, the decoder 23 adds a demodulated signal newly generated by the demodulator 22 (a likelihood value corresponding to a redundancy bit) to a previously generated demodulated signal (likelihood values corresponding to data and a portion of a parity bit). Then, the decoder 23 decodes a demodulated signal in which the redundancy bit has been added. Here, the number of iterations of the iterative decoding is dynamically determined by the retransmission controller 27. For example, the number of iterations of the iterative decoding in the second data transmission is determined in the first data reception. The number of iterations of the iterative decoding in the third data transmission is determined in the second data transmission. In other words, the number of iterations of the iterative decoding in the second and subsequent data transmissions is respectively determined in the immediately previous data transmission.

In S13, the controller 25 decides whether the receiver 20 is successful in receiving data. In the present embodiment, it is decided that data reception is successful when the decoder 23 is successful in properly decoding data. When the controller 25 has decided that the data reception is successful, the receiver 20 transmits an ACK signal to the transmitter 10 in S14. When data reception is not successful, the controller 25 performs the processes of S21 to S27.

In S21, the SNR estimator 26 estimates an SNR of the signal received from the transmitter 10. In this case, the SNR rarely varies greatly with respect to time except for the case in which a wireless communication terminal moves at high speed. Thus, the SNR value obtained in S21 is used by the transmission data length calculator 27b as an estimated SNR for a next data transmission.

In S22, according to an SNR estimated by the SNR estimator 26, the selector 27a selects all of the communication patterns that satisfy a requested quality. Here, the selector 27a refers to quality information stored in the quality information storage 28 so as to select a communication pattern that satisfies a requested quality.

Figure 7:
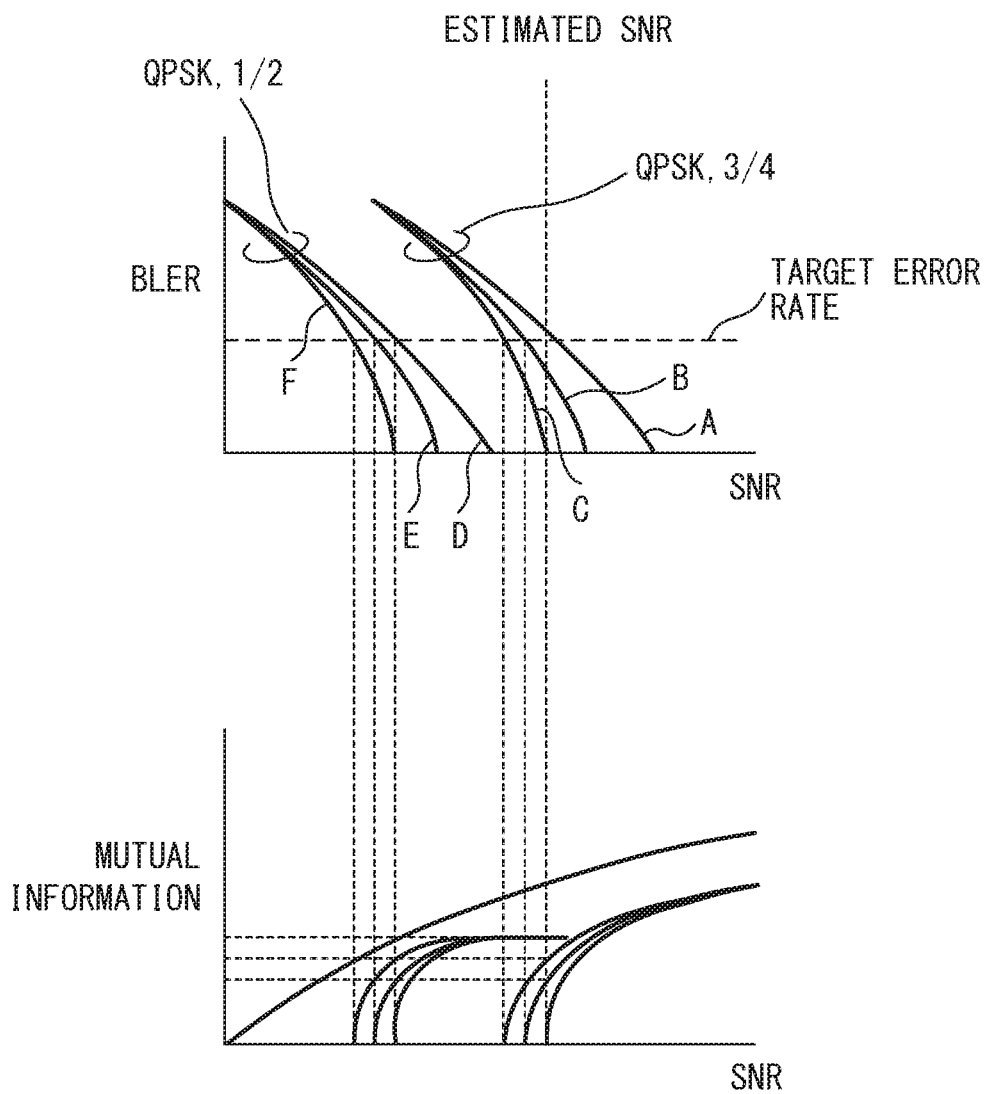
FIG. 7 illustrates an example of quality information.

FIG. 7 illustrates an example of quality information stored in the quality information storage 28. The quality information indicates, for example, an error rate for an SNR. The error rate is a block error rate (BLER) in the present embodiment. The error rate is prepared for each modulation scheme, for each coding rate, and for each number of iterations of an iterative decoding. FIG. 7 illustrates an example of an error rate when the modulation scheme is QPSK, the coding rate is 1/2 or 3/4, and the number of iterations of the iterative decoding is 5, 15, or 30. The quality information is prepared by, for example, measurement or simulation. A combination of a coding rate and the number of iterations of the iterative decoding (or a combination of a modulation scheme, a coding rate, and the number of iterations of the iterative decoding) may hereinafter be referred to as a communication pattern. However, the communication pattern may include a parameter other than a modulation scheme, a coding rate, and the number of iterations of the iterative decoding.

The communication quality (here, an error rate) depends on a coding rate and the number of iterations of the iterative decoding, as illustrated in FIG. 7. Specifically, the error rate is lower if the coding rate is lower. The coding rate indicates a length of an information bit with respect to a length of a code word. Further, the error rate becomes lower if the number of iterations of the iterative decoding is increased. Furthermore, the error rate is higher if a higher-order modulation scheme is used (if the number of bits transmitted in one symbol by the modulation scheme is larger), although this is not illustrated.

The selector 27a selects a communication pattern that satisfies a requested quality. It is preferable that the selector 27a select all of the communication patterns that satisfy the requested quality. The requested quality is specified by, for example, a user or a network administrator as a target error rate. Here, the selector 27a selects a communication pattern in which an error rate is lower than the target error rate at the estimated SNR obtained by the SNR estimator 26. The communication pattern selected in S22 represents a candidate communication pattern applied to a next data transmission.

For example, it is assumed that the modulation scheme is QPSK. In this case, the selector 27a selects, from six communication patterns A to F illustrated in FIG. 7, a communication pattern in which an error rate is lower than a target error rate at the estimated SNR. The following are the communication patterns A to F. Note that three communication parameters below are a modulation scheme, a coding rate and a number of iterations of an iterative decoding.
Communication pattern A: QPSK, 3/4, 5
Communication pattern B: QPSK, 3/4, 15
Communication pattern C: QPSK, 3/4, 30
Communication pattern D: QPSK, 1/2, 5
Communication pattern E: QPSK, 1/2, 15
Communication pattern F: QPSK, 1/2, 30

In this example, the error rate of the communication pattern A is higher than the target error rate at the estimated SNR. On the other hand, each of the error rates of the communication patterns B to F is lower than the target error rate at the estimated SNR. In this case, the selector 27a selects the communication patterns B to F.

In S23, the transmission data length calculator 27b converts the estimated SNR into mutual information for each communication pattern selected by the selector 27a. Here, a method for calculating mutual information that corresponds to an SNR in a communication for which a modulation scheme has been specified is well known, which is described in, for example, J. F. Cheng et al., "Adaptive Incremental Redundancy".

The mutual information represents the number of bits transmitted in one symbol and depends on the modulation scheme and the SNR. Thus, the amount of mutual information depends on the SNR when the modulation scheme is fixed. Specifically, the amount of mutual information is smaller if the SNR is lower. FIG. 7 illustrates an example of a correspondence relationship between an SNR and mutual information. The amount of mutual information obtained based on the SNR of a received signal in S23 is used as an estimated mutual information in a next data transmission.

The mutual information may be calculated from the estimated SNR, or it may be obtained using other methods. For example, the correspondence relationship between an SNR and an amount of mutual information is calculated and stored in a table in advance for each communication pattern. In this case, the transmission data length calculator 27b searches the table using the estimated SNR so as to obtain a corresponding amount of mutual information.

In S24, the transmission data length calculator 27b calculates, for each communication pattern selected by the selector 27a, a transmission data length that indicates a length of a redundancy bit to be transmitted in a next data transmission. The transmission data length is calculated using, for example, Formula (1).

$$N_{s,k+1}C_{k+1} > R_1 N_{s,1} - \sum_{i=1}^{k} N_{s,i}C_i \quad (1)$$

$R_1$ represents a data rate (the number of bits per symbol) in the first data transmission and is specified in advance. $N_{s,i}$ represents the number of modulation symbols in the i-th data transmission. $C_i$ represents an amount of mutual information in the i-th data transmission. $N_{s,k+1}$ (the length of a redundancy bit can be obtained by multiplying this value by the number of bits transmitted in one symbol by a modulation scheme) represents the number of modulation symbols in a next data transmission. $C_{k+1}$ represents an amount of mutual information in a next data transmission. As described above, the mutual information is calculated from the estimated SNR in the k-th data transmission (that is, calculated from the estimated SNR in the immediately previous data transmission).

Formula (1) represents a condition under which data is properly decoded in the receiver 20. Here, Formula (1) will be satisfied if the transmission data length indicating a length of a redundancy bit in a next data transmission is sufficiently long. However, it is preferable that the transmission data length indicating a length of a redundancy bit be short in order to reduce communication resource and/or to make a transmission latency low. Thus, the transmission data length calculator 27b determines a transmission data length in a next data transmission such that $N_{s,k+1}$ is smallest while Formula (1) is satisfied. As described above, the transmission data length calculator 27b calculates, for each communication pattern, a shortest transmission data length wherein the receiver 20 is expected to successfully receive data.

In S25, the transmission latency calculator 27c calculates a transmission latency for each communication pattern selected by the selector 27a. The transmission latency depends on a transmission data length, a code type, and the number of iterations of an iterative decoding. Specifically, the transmission latency is lower if the transmission data length indicating a length of a redundancy bit is shorter. Further, the transmission latency is lower if the number of iterations of an iterative decoding is smaller. It is assumed that the transmission latency can be calculated using a specified formula.

In S26, the retransmission parameter generator 27d identifies, from among the communication patterns selected by the selector 27a, a communication pattern with lowest transmission latency. Then, the retransmission parameter generator 27d generates a retransmission parameter according to the identified communication pattern. The retransmission parameters include the number of iterations of an iterative decoding performed in the identified communication pattern, and a transmission data length that is calculated for the identified communication pattern.

For example, it is assumed that the communication patterns B and C are selected by the selector 27a in the example illustrated in FIG. 7. In this case, transmission latencies are calculated for the communication patterns B and C, respectively. It is assumed that the transmission latency for the communication pattern B is lower than the transmission latency for the communication pattern C. In this case, the retransmission parameter generator 27d outputs the "number of iterations of an iterative decoding in the communication pattern B (15)" and the "transmission data length calculated for the communication pattern B" as retransmission parameters.

In S27, the receiver 20 reports the transmission parameters to the transmitter 10. Here, the receiver 20 does not need to report a parameter that is used only in the receiver 20 (for example, the number of iterations of an iterative decoding). That is, the receiver 20 may only report the "transmission data length" to the transmitter 10 as a retransmission parameter. Then, the transmitter 10 performs a next data transmission according to this retransmission parameter. The controller 25 gives, to the decoder 23, the "number of iterations of an iterative decoding" as a retransmission parameter. Then, according to this retransmission parameter, the decoder 23 decodes a demodulated signal obtained by demodulating a next received signal.

As described above, in the wireless communication system according to the first embodiment, a retransmission parameter that satisfies a requested quality and in which the transmission latency is lowest is determined in data retransmission. Then, the transmitter 10 transmits data according to this retransmission parameter, and the receiver 20 recovers data from a received signal according to this retransmission parameter. This makes it possible to make the transmission latency lower in a radio environment in which data retransmission is needed.

In the embodiment described above, a modulation scheme is fixed in order to simplify descriptions, but the first embodiment is not limited to this configuration. In other words, the modulation scheme in data retransmission may be different from the modulation scheme in the first data transmission. Further, the controller 25 may dynamically determine the modulation scheme every time data retransmission is performed. In these cases, the retransmission controller 27 identifies a combination of a modulation scheme, a coding rate, and the number of iterations of an iterative decoding that satisfies a requested quality and in which the transmission latency is lowest, so as to determine a transmission data length, a modulation scheme, and the number of iterations of the iterative decoding that correspond to the identified combination. Then, the transmitter 10 modulates a redundancy bit of a specified length with a specified modulation scheme and transmits the modulated redundancy bit to the receiver 20.

Second Embodiment

In the first embodiment, the receiver 20 generates a retransmission parameter. On the other hand, in a second embodiment, the transmitter 10 generates a retransmission parameter.

Thus, in the second embodiment, the function of the retransmission controller 27 is implemented in the controller 15 and the quality information storage 28 is implemented in the transmitter 10. In this case, the receiver 20 reports an SNR estimated by the SNR estimator 26 to the transmitter 10.

Further, in the second embodiment, the transmitter 10 performs the processes of S22 to S26 illustrated in FIG. 6 in place of S4 in the flowchart illustrated in FIG. 5. In other words, the transmitter 10 generates a retransmission parameter according to an estimated SNR. Then, the transmitter 10 transmits a redundancy bit according to the retransmission parameter (in this case, a transmission data length) generated by the transmitter 10 itself. Further, the transmitter 10 reports the generated retransmission parameter to the receiver 20. Then, the receiver 20 receives data according to the reported retransmission parameter (in this case, the number of iterations of an iterative decoding).

Third Embodiment

In the first and second embodiments, the retransmission parameter is determined such that the transmission latency of each data transmission is lowest. On the other hand, in a third embodiment, a retransmission parameter is determined such that the total transmission latency related to one or more data transmissions is lowest.

Figure 8:
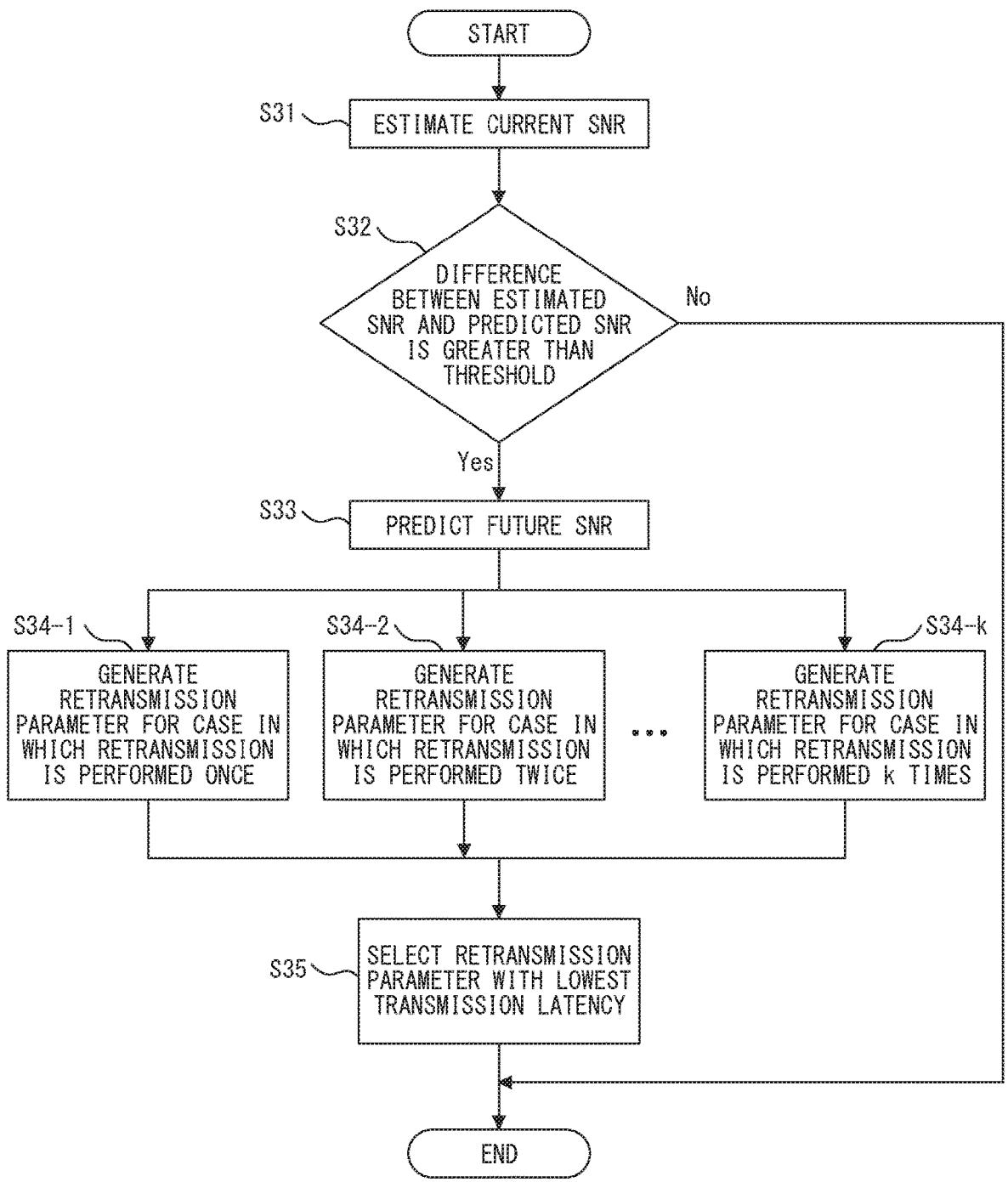
FIG. 8 is a flowchart that illustrates an example of a method for determining a retransmission parameter in a third embodiment.

FIG. 8 is a flowchart that illustrates an example of a method for determining a retransmission parameter in the third embodiment. The process of the flowchart illustrated in FIG. 8 is performed instead of the processes of S21 to S26 in FIG. 6. In other words, the process of this flowchart is performed when the receiver 20 is not successful in receiving data. In the following descriptions, the process of the flowchart illustrated in FIG. 8 is performed in the receiver 20. However, the process of the flowchart illustrated in FIG. 8 may be performed in the transmitter 10 excepting the process of S31.

In S31, the SNR estimator 26 estimates an SNR of a signal received from the transmitter 10. In S32, the retransmission controller 27 decides whether a difference between the estimated SNR and a predicted SNR is greater than a specified threshold. An initial value of the predicted SNR is, for example, an expected maximum value of an SNR. When the process of the flowchart illustrated in FIG. 8 is performed repeatedly, the SNR obtained in the immediately previous process of S33 is used in S32.

When the difference described above is greater than the threshold, it is decided that the SNR has been predicted with a low accuracy. In this case, the retransmission controller 27 predicts a future SNR in S33. The future SNR is calculated by, for example, performing extrapolation using one or more estimated SNRs in the past and a current estimated SNR.

In S34-1, the retransmission controller 27 generates a retransmission parameter for the case in which a transmission of a redundancy bit is performed once. This process is substantially the same as the processes of S22 to S26 illustrated in FIG. 6. In other words, a combination of a "transmission data length" and the "number of iterations of an iterative decoding" that satisfies a requested quality and in which the transmission latency is lowest is determined.

In S34-2, the retransmission controller 27 generates a retransmission parameter for the case in which a transmission of a redundancy bit is performed twice. This process is also substantially the same as the processes of S22 to S26 illustrated in FIG. 6. However, when a transmission of a redundancy bit is performed twice, a parity bit having a length that is the transmission data length calculated in S24 is divided into two portions and they are sequentially transmitted. Thus, in S25, a transmission latency is calculated while taking this division into consideration. For example, when the transmission data length calculated in S24 is 50 bits, a value twice the transmission latency for the case in which a parity bit of 25 bits is transmitted is calculated.

Likewise, while changing the number of data transmissions, the retransmission controller 27 generates a retransmission parameter for each case. A variable k used in this flowchart is obtained by subtracting the number of performed transmissions from a maximum value of the number of transmissions. This results in generating a retransmission parameter for each of the cases in which a transmission of a redundancy bit is performed once to k times.

In S35, the retransmission controller 27 selects, from among the retransmission parameters generated in S34-1 to S34-$k$, a retransmission parameter with lowest transmission latency. Then, the retransmission controller 27 outputs the selected retransmission parameter. However, in the third embodiment, the retransmission parameters include the number of transmissions of a redundancy bit in addition to a transmission data length and the number of iterations of an iterative decoding. For example, "number of transmissions=1" is output when the retransmission parameter generated in S34-1 is selected, and "number of retransmissions=2" is output when the retransmission parameter generated in S34-2 is selected. Further, when one of the retransmission parameters generated in S34-2 to S34-$k$ is selected, the transmission data length indicates a length of a parity bit obtained by performing division.

After that, the transmitter 10 transmits a redundancy bit of a specified length a specified number of times. The receiver 20 performs decoding a specified number of times for each data transmission.

As described above, according to the third embodiment, a retransmission parameter is determined such that the total transmission latency related to one or more data transmissions is lowest. This results in making the total data transmission time shorter while satisfying a requested quality.

There is no need to perform the processes of S32 and S33 in an environment in which there is a minor change in SNR with respect to time. In this case, the mutual information and the transmission data length in the future are calculated according to a current estimated SNR.

Fourth Embodiment

In a fourth embodiment, the wireless communication system can transmit data using a plurality of frequency bands in parallel. In the example illustrated in FIG. 2, the wireless communication system 1 can transmit data using two or more frequency bands from among a 920 MHz band, a 2.4 GHz band, and a 5 GHz band at the same time.

Figure 9:
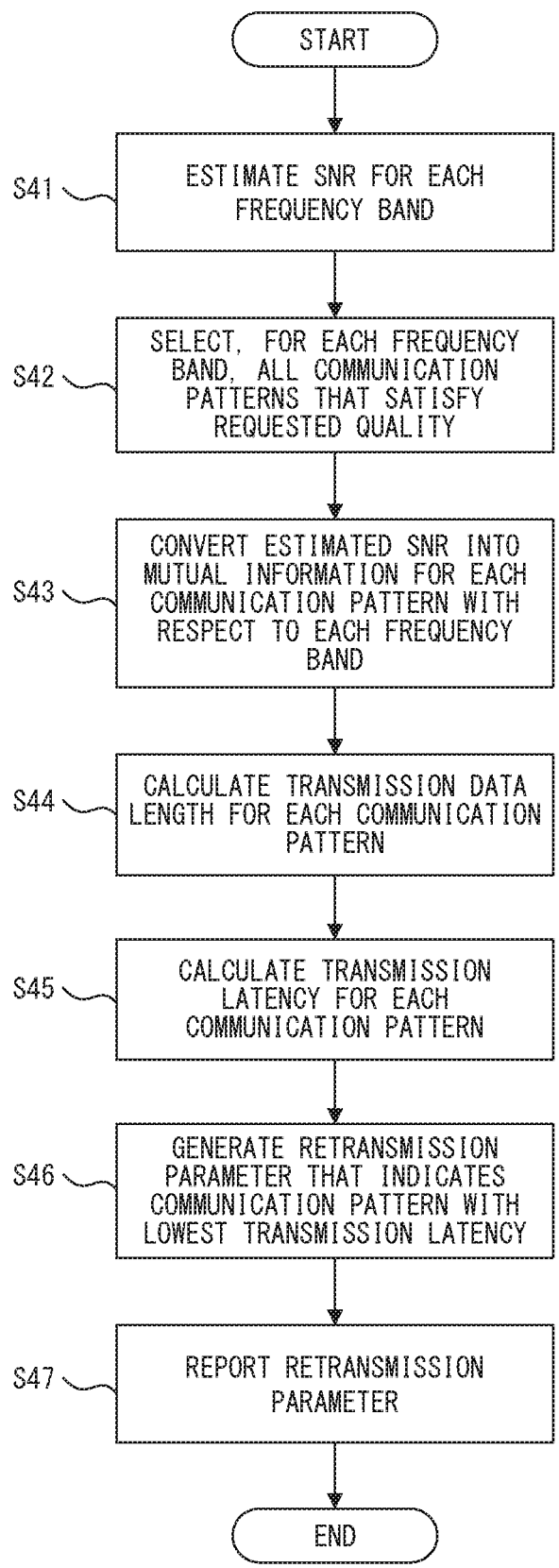
FIG. 9 is a flowchart that illustrates an example of a method for determining a retransmission parameter in a fourth embodiment.

FIG. 9 is a flowchart that illustrates an example of a method for determining a retransmission parameter in the fourth embodiment. The process of the flowchart illustrated in FIG. 9 is performed instead of the processes of S21 to S27 in FIG. 6. In other words, the process of this flowchart is performed when the receiver 20 is not successful in receiving data. In the following descriptions, the process of the flowchart illustrated in FIG. 9 is performed in the receiver 20. However, the process of the flowchart illustrated in FIG. 9 may be performed in the transmitter 10 excepting the process of S41.

The processes of S41 to S43 are substantially the same as the processes of S21 to S23 illustrated in FIG. 6. However, the processes of S41 to S43 are performed for each frequency band. In other words, in S41, the SNR estimator 26 estimates, for each frequency band, an SNR of a signal received from the transmitter 10. In S42, the selector 27a selects, for each frequency band, a communication pattern that satisfies a requested quality. In S43, with respect to each frequency band, the transmission data length calculator 27b calculates mutual information for each of the communication patterns selected by the selector 27a.

In S44, the transmission data length calculator 27b calculates, for each of the communication patterns selected by the selector 27a, a transmission data length that indicates a length of a redundancy bit to be transmitted in a next data transmission. However, in the fourth embodiment, the transmission data length is calculated based on the sum of the amounts of mutual information of the respective frequency bands. In other words, the transmission data length is calculated using Formula (2). The modulation schemes for the respective frequency bands may be the same as one another, or they may be different from one another.

$$N_{s,k+1} \sum_{j=1}^{F} C_{k+1,j} > R_1 N_{s,1} - \sum_{i=1}^{k} N_{s,i} \sum_{j=1}^{F} C_{i,j} \quad (2)$$

$R_1$ represents a data rate (the number of bits per symbol) in the first data transmission and is specified in advance. $N_{s,i}$ represents the number of modulation symbols in the i-th data transmission. $C_{i,j}$ represents an amount of mutual information in the i-th data transmission in a frequency band j. $N_{s,k+1}$ (the length of a redundancy bit can be obtained by multiplying this value by the number of bits transmitted in one symbol by a modulation scheme) represents the number of modulation symbols in a next data transmission. $C_{k+1,j}$ represents an amount of mutual information in a next data transmission in the frequency band j. As described above, the mutual information is calculated from the estimated SNR in the k-th data transmission. When F is 1 (that is, when data is transmitted using only one frequency band), Formula (2) is the same as Formula (1) in the first embodiment.

In S45, the transmission latency calculator 27c calculates a transmission latency for each of the communication patterns selected by the selector 27a. In S46, the retransmission parameter generator 27d identifies, from among the communication patterns selected by the selector 27a, a communication pattern with lowest transmission latency. In addition, the retransmission parameter generator 27d generates a retransmission parameter for the identified communication pattern. Then, the receiver 20 reports the retransmission parameter to the transmitter 10.

The transmitter 10 transmits a next redundancy bit to the receiver 20 according to the retransmission parameter reported by the receiver 20. Here, the redundancy bit is transmitted using a plurality of frequency bands. In this example, lengths ($N_{s, k+1}$) of a redundancy bit that are transmitted using the plurality of frequency bands are the same as one another.

In the example described above, data transmission is performed using a plurality of frequency bands, but data transmission may be performed using one of the plurality of frequency bands. In this case, the retransmission controller 27 selects, from among the communication patterns selected for all of the plurality of frequency bands, a communication pattern with lowest transmission latency. In other words, with respect to each of the plurality of frequency bands, the retransmission controller 27 calculates a transmission data length and a transmission latency for each of the communication patterns selected by the selector 27a. Then, the retransmission controller 27 identifies, from among all of the communication patterns, a communication pattern with lowest transmission latency and determines retransmission parameters (a frequency band, a transmission data length, and the number of iterations of an iterative decoding) that correspond to the identified communication pattern.

A retransmission control obtained by combining the third and fourth embodiments may be performed. In other words, retransmission parameters for a plurality of frequency bands may be determined such that the sum of the latencies until reception is successful is lowest.

Fifth Embodiment

The wireless communication system according to a fifth embodiment is a wireless LAN system that employs CSMA/CA. Further, a retransmission parameter is generated in the receiver 20. In other words, a retransmission parameter is reported from the receiver 20 to the transmitter 10.

FIG. 10 illustrates an example of a retransmission control performed in a wireless LAN system that employs CSMA/CA. In this example, a source terminal (such as the wireless communication device 2) obtains a transmission right and transmits data to a destination terminal (such as the wireless communication device 3). A wireless resource is in use during a "busy" due to other communications.

Figure 11A:
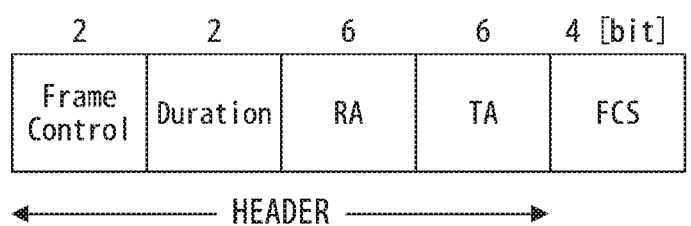
FIGS. 11A and 11B illustrate examples of a frame configuration.

After a distributed coordination function inter-frame space (DIFS) has elapsed since the finish time of the "busy", a time period (a contention window: CW) in which a transmission right is to be obtained is set. It is assumed that the source terminal obtains a transmission right during this contention window. The source terminal transmits an RTS (request to send) frame to the destination terminal. As illustrated in FIG. 11A, the RTS frame includes a frame control, time period information (duration), destination terminal information (receiver address: RA), source terminal information (transceiver address: TA), and a frame check sequence (FCS). The "Duration" specifies a time period in which other terminals are prohibited from performing transmission (network allocation vector: NAV).

Figure 11B:
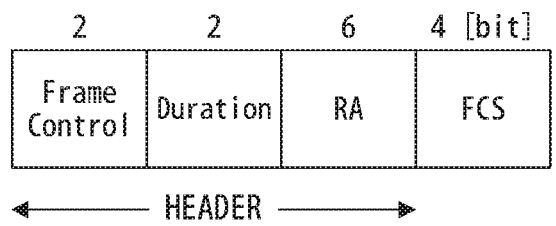

When the destination terminal receives the RTS frame from the transmission terminal, the destination terminal returns a CTS (clear to send) frame to the source terminal after a short inter-frame space (SIFS) has elapsed. As illustrated in FIG. 11B, the CTS frame includes a frame control, Duration, RA, and FCS.

When the source terminal receives the CTS frame from the destination terminal, the source terminal transmits data to the destination terminal after an SIFS has elapsed. In this example, the destination terminal is not successful in receiving data. In this case, the destination terminal does not transmit an ACK frame to the transmission terminal. In other words, the source terminal does not receive an ACK frame from the destination terminal. When the source terminal does not receive an ACK frame within a specified time period since the data transmission, the source terminal decides that data retransmission is needed.

When the source terminal obtains a transmission right during the CW, the source terminal transmits an RTS frame to the destination terminal again. When the source terminal receives a CTS frame from the destination terminal, the source terminal transmits the same data as last time to the destination terminal after an SIFS has elapsed. When the destination terminal is successful in receiving data, the destination terminal transmits an ACK frame to the source terminal. As described above, in the sequence illustrated in FIG. 10, there is a need for the source terminal to obtain a transmission right again when the destination terminal is not successful in receiving data. Here, the source terminal is not always able to immediately obtain a transmission right during a next CW. Thus, there is a possibility that it will take a long time to perform a retransmission control.

FIG. 12 illustrates an example of a retransmission control according to the fifth embodiment. In this example, the source terminal and the destination terminal perform a retransmission control according to the first, third, or fourth embodiment. The operation of obtaining a transmission right and transmitting data to the source terminal is substantially the same in FIGS. 10 and 12, so the descriptions are omitted.

When the destination terminal is not successful in receiving data, the destination terminal generates a retransmission parameter. The retransmission parameter is generated by, for example, the method illustrated in FIG. 6, 8, or 9. Further, the destination terminal transmits a CTS frame to the source terminal. This CTS frame is used as a negative ACK (NACK). This frame may hereinafter be referred to as a CTS/NACK frame. The CTS/NACK frame has the same configuration as the frame illustrated in FIG. 11B (that is, a usual CTS frame). However, a transmission prohibiting time period (Network Allocation Vector: NAV) that is set in the "duration" in the CTS/NACK frame is calculated from a transmission latency between the transmitter 10 and the receiver 20 (including a time needed to propagate a signal from the transmitter 10 to the receiver 20, a time of processing performed by the demodulator 22, and a time of processing performed by the decoder 23, as in the first embodiment) that is calculated from retransmission parameters (a transmission data length, a coding rate, and the number of iterations of an iterative decoding), and from a time needed to process a CSMA/CA sequence (such as an SIFS and an ACK transmission time). Then, the source terminal back-calculates a transmission data length in a next data transmission from the NAV set in the "duration" in the received CTS/NACK frame. It is assumed that, in this example, the transmitter 10 includes the quality information storage 28 in order to back-calculate a transmission data length.

A CTS/NACK frame transmitted from the destination terminal has the same header as a usual CTS frame. In other words, a NAV is set in the header of the CTS/NACK frame as time period information. The NAV indicates a time period in which wireless communication devices other than a wireless communication device specified by the RA in the CTS/NACK frame are prohibited from performing transmission until a specified time period elapses. Thus, each terminal that receives the CTS/NACK frame is prohibited from transmitting a signal during a time period specified by the NAV. However, the source terminal is specified by the RA in the CTS/NACK frame. Thus, the source terminal is allowed to transmit a signal even during the time period specified by the NAV.

The source terminal transmits a redundancy bit according to the retransmission parameter reported by a CTS/NACK frame. For example, when the transmission data length is represented using a NAV, the source terminal calculates the transmission data length based on the NAV and transmits a redundancy bit of the calculated transmission data length to the destination terminal. Here, the source terminal may calculate the transmission data length from a time period corresponding to the NAV, using the quality information storage 28. When the destination terminal is successful in receiving data, the destination terminal transmits an ACK frame to the source terminal. Note that when the transmission data length is reported as a retransmission parameter, the source terminal transmits a redundancy bit of the reported length to the destination terminal.

As describe above, in the fifth embodiment, when the destination terminal is not successful in receiving data, a CTS/NACK frame is output from the destination terminal, and a wireless resource is allocated to a communication between the source terminal and the destination terminal. At this point, other terminals are prohibited from transmitting a signal. In other words, the source terminal can immediately transmit a redundancy bit without newly obtaining a transmission right in the contention window. Thus, when data retransmission is to be performed, an entire time period for transmission (a time period from the first data transmission to a completion of data retransmission) is shorter according to the fifth embodiment, compared to the case of the sequence illustrated in FIG. 10.

In addition, in the fifth embodiment, a retransmission parameter is reported from the destination terminal to the source terminal using a CTS/NACK frame. Thus, an overhead for reporting a retransmission parameter is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication system in which encoded bits are transmitted from a first wireless communication device to a second wireless communication device and one or more redundancy bits for decoding the encoded bits is transmitted from the first wireless communication device to the second wireless communication device when the second wireless communication device fails to decode the encoded bits, the wireless communication system comprising a processor configured to select a plurality of communication patterns that respectively satisfy a requested quality, each of the selected plurality of communication patterns indicating a combination of a plurality of parameters including a coding rate and a number of iterations of an iterative decoding, calculate, for each of the selected plurality of communication patterns, a transmission data length that indicates a length of the one or more redundancy bits wherein the second wireless communication device is expected to successfully decode the encoded bits by using the one or more redundancy bits, calculate, for each of the selected plurality of communication patterns, a transmission latency between the first wireless communication device and the second wireless communication device based on the calculated transmission data length, and generate a retransmission parameter corresponding to a communication pattern with lowest transmission latency among the selected plurality of communication patterns, wherein the first wireless communication device transmits the one or more redundancy bits according to the retransmission parameter, and the second wireless communication device decodes the encoded bits by using the one or more redundancy bits according to the retransmission parameter.

2. The wireless communication system according to claim 1, wherein the retransmission parameter includes a transmission data length and a number of iterations of the iterative decoding that correspond to the communication pattern with lowest transmission latency, the first wireless communication device transmits the one or more redundancy bits according to the transmission data length included in the retransmission parameter, and the second wireless communication device decodes the encoded bits by using the one or more redundancy bits according to the number of iterations of the iterative decoding included in the retransmission parameter.

3. The wireless communication system according to claim 1, wherein the retransmission parameter includes a modulation scheme, a transmission data length, and a number of iterations of the iterative decoding that correspond to the communication pattern with lowest transmission latency, the first wireless communication device transmits the one or more redundancy bits according to the modulation scheme and the transmission data length included in the retransmission parameter, and the second wireless communication device decodes the encoded bits by using the one or more redundancy bits according to the number of iterations of the iterative decoding included in the retransmission parameter.

4. The wireless communication system according to claim 1, wherein the encoded bits are transmitted from the first wireless communication device to the second wireless communication device using a plurality of frequency bands, the processor selects, for each of the plurality of frequency bands, a plurality of communication patterns that respectively satisfy the requested quality, the processor calculates, for each of the selected plurality of communication patterns, a transmission data length that indicates a length of one or more redundancy bits wherein the second wireless communication device is expected to successfully decode the encoded bits by using the one or more redundancy bits, the processor calculates, for each of the selected plurality of communication patterns, a transmission latency between the first wireless communication device and the second wireless communication device based on the calculated transmission data length, and the processor identifies, from among combinations of communication patterns each of which is selected from the plurality of communication patterns selected for each of the plurality of frequency bands, a combination of communication patterns with lowest transmission latency, and generates a retransmission parameter corresponding to each of the plurality of communication patterns included in the identified combination.

5. The wireless communication system according to claim 1, wherein the processor calculates total latencies for a plurality of cases in which numbers of retransmissions are different from each other, and the processor determines a number of retransmissions in which the total latency is lowest.

6. A retransmission parameter determination device that is used in a wireless communication system in which encoded bits are transmitted from a first wireless communication device to a second wireless communication device and one or more redundancy bits for decoding the encoded bits is transmitted from the first wireless communication device to the second wireless communication device when the second wireless communication device fails to decode the encoded bits, the retransmission parameter determination device comprising a processor configured to select a plurality of communication patterns that respectively satisfy a requested quality, each of the selected plurality of communication patterns indicating a combination of a plurality of parameters including a coding rate and a number of iterations of an iterative decoding, calculate, for each of the selected plurality of communication patterns, a transmission data length that indicates a length of the one or more redundancy bits wherein the second wireless communication device is expected to successfully decode the encoded bits by using the one or more redundancy bits, calculate, for each of the selected plurality of communication patterns, a transmission latency between the first wireless communication device and the second wireless communication device based on the calculated transmission data length, and generate a retransmission parameter corresponding to a communication pattern with lowest transmission latency among the selected plurality of communication patterns.

* * * * *